United States Patent [19]

Fornasari et al.

[11] Patent Number: 5,780,616
[45] Date of Patent: Jul. 14, 1998

[54] CATIONIC POLYMER

[75] Inventors: Giancarlo Fornasari, Pescara; Giangiacomo Torri, Milan; Giovanni Carlucci, Chieti, all of Italy

[73] Assignee: The Procter & Gamble Company, Cincinnati, Ohio

[21] Appl. No.: 836,297

[22] PCT Filed: Nov. 13, 1995

[86] PCT No.: PCT/US95/14679

§ 371 Date: Jul. 10, 1997

§ 102(e) Date: Jul. 10, 1997

[87] PCT Pub. No.: WO96/15154

PCT Pub. Date: May 23, 1996

[30] Foreign Application Priority Data

Nov. 10, 1994 [IT] Italy ................................. T094A0891

[51] Int. Cl.⁶ ............................. C08B 11/14; C08B 15/10
[52] U.S. Cl. ............... 536/30; 536/47; 536/56; 536/84; 536/88; 536/106; 536/124
[58] Field of Search ................... 536/56, 59, 84, 536/88, 92, 30, 47, 106, 124

[56] References Cited

U.S. PATENT DOCUMENTS

| | | | |
|---|---|---|---|
| 4,064,342 | 12/1977 | Saika et al. | 536/59 |
| 4,480,091 | 10/1984 | Brewer | 536/59 |
| 5,302,249 | 4/1994 | Malhotra et al. | 162/135 |
| 5,349,089 | 9/1994 | Tsai et al. | 564/291 |
| 5,378,828 | 1/1995 | Usher et al. | 536/59 |
| 5,407,919 | 4/1995 | Brode et al. | 514/57 |
| 5,470,964 | 11/1995 | Qin | 536/20 |
| 5,498,705 | 3/1996 | Qin | 536/20 |

FOREIGN PATENT DOCUMENTS

| | | |
|---|---|---|
| 3644579 | 12/1988 | Germany. |
| 63-28453 | 2/1988 | Japan. |
| 92/19652 | 11/1992 | WIPO. |
| WO 92/19652 | 11/1992 | WIPO ............. C08B 11/145 |

OTHER PUBLICATIONS

Galkis et al., Vysokomol. Soedin., Ser. B, vol. 15(7): 557–558, 1973.
Sidiskis et al., Bum. Prom., vol. 6: 9–10, 1974.
Bruneau et al., Comptes Rendus De L'Academie Des Sciences, vol. 274(26): 2152–2154, 1972.
Bruneau et al., Comptes Rendus De L'Academie Des Sciences, vol. 274(2): 143–145, 1972.
Bruneau et al., Bull. Soc. Chim. Fr., vol. 2 (Part 2): 552–562, 1973.

*Primary Examiner*—John Kight
*Assistant Examiner*—Howard C. Lee
*Attorney, Agent, or Firm*—Carl J. Roof; E. Kelly Linman; Jacobus C. Rasser

[57] ABSTRACT

The invention relates to a cationic polysaccharide, preferably in fibrous form, having superabsorbent characteristics. The polysaccharides are substituted by quaternary ammonium groups, have a ds of at least 0.5, preferably 0.5 to 2.5 and are cross-linked to a sufficient extent that it remains insufficient in water. The polysaccharide is preferably cellulose. An increased number of functional groups in the product improves superabsorbent properties, whereas use of a cross-linking agent makes it possible to control the gel strength of the product and makes it easier to tailor the characteristics of the product to those which are required.

26 Claims, No Drawings

CATIONIC POLYMER

The present invention relates to a cationic polymer more particularly a water absorbent polymer of the type commonly referred to as a "superabsorbent".

The substances currently termed "superabsorbents" are typically slightly cross-linked hydrophillic polymers. The polymers may differ in their chemical nature but they share the property of being capable of absorbing and retaining even under moderate pressure amounts of aqueous fluids equivalent to many times their own weight. For example superabsorbents can typically absorb up to 100 times their own weight or even more of distilled water.

Superabsorbents have been suggested for use in many different industrial applications where advantage can be taken of their water absorbing and/or retaining properties and examples include agriculture, the building industry, the production of alkaline batteries and filters. However the primary field of application for superabsorbents is in the production of hygienic and/or sanitary products such as disposable sanitary napkins and disposable diapers either for children or for incontinent adults. In such hygienic and/or sanitary products, superabsorbents are used, generally in combination with cellulose fibres, e.g. cellulose fluff, to absorb body fluids such as menses or urine. However, the absorbent capacity of superabsorbents for body fluids is dramatically lower than for deionised water. It is generally believed that this effect results from the electrolyte content of body fluids and the effect is often referred to as "salt poisoning".

The water absorption and water retention characteristics of superabsorbents are due to the presence in the polymer structure of ionisable functional groups. These groups may be carboxyl groups, a high proportion of which are in the salt form when the polymer is dry but which undergo dissociation and salvation upon contact with water. In the dissociated state, the polymer chain will have a series of functional groups attached to it which groups have the same electric charge and thus repel one another. This leads to expansion of the polymer structure which, in turn, permits further absorption of water molecules although this expansion is subject to the constraints provided by the cross-links in the polymer structure which must be sufficient to prevent dissolution of the polymer. It is assumed that the presence of a significant concentration of electrolytes in the water interferes with dissociation of the functional groups and leads to the "salt poisoning" effect. Although most commercial superabsorbents are anionic, it is equally possible to make cationic superabsorbents with the functional groups being, for example, quaternary ammonium groups. Such materials also need to be in salt form to act as superabsorbents and their performance is also affected by the salt-poisoning effect.

A cationic superabsorbent based on a polysaccharide such as cellulose will have polysaccharide hydroxyl groups reacted with a reagent (a derivatising reagent) which converts these hydroxyl groups into a cationic group, e.g. a quaternary ammonium group. For use as a superabsorbent, particularly in hygienic and/or sanitary products, it is advantageous that the product should be based on fibrous cellulose since this can be combined and processed more easily with cellulose fluff which also has a fibrous character.

WO 92/19652 relates to a fibrous cationic polysaccharide which can be obtained by reacting fibrous polysaccharides such as cellulose with an excess of quaternary ammonium compounds containing at least one group capable of reacting with the polysaccharide hydroxyl groups. Whilst the product of WO 92/19652 shows useful properties as a superabsorbent there is a limit to the absorption properties which can be achieved.

As explained above, the absorption of water by a superabsorbent involves the functional groups attached to the polymer chain and, in principle, the absorption capacity depends on the ratio of functional groups to the remainder of the polymer, i.e. the more functional groups that are introduced the greater the repulsion between the polymer chains and the greater the potential for water absorption. On the other hand, whilst cellulose in its natural state is insoluble in water, derivatisation of cellulose, in particular introduction of hydrophillic groups, tends to increase solubility in water. Accordingly attempts to increase water absorption of the product of WO 92/19652 by increasing the ds would be likely to lead to a water soluble polymer rather than a superabsorbent which, by definition, must remain insoluble in water.

In addition, the fibrous form of the material means that it is difficult for the derivatising agent to gain access to polysaccharide hydroxyl groups without destroying the structural backbone of the material. Thus, although WO 92/19652 gives a nominal figure of 0.5 to 1.1 for the degree of substitution ("ds") with the derivatising agent it is not generally possible to obtain a ds higher than about 0.7 without activation of the polysaccharide which damages the structural integrity of the polysaccharide fibres thereby leading to solubilisation of the cellulose. Activation can take the form, for example, of application of pressure to burst the fibres open and expose more potential reaction sites, or use of a chemical activation agent such as zinc chloride. Example 6 of WO 92/19652 achieves a ds of 1.10 but only by using activation with zinc chloride and the product would have been largely soluble.

Processes are known for the cross-linking of cellulose using cross-linking agents such as formaldehyde, epichlorohydrin, diepoxides, dicarboxylic acids, dialdehydes and diisocyanates to obtain highly water insoluble products. However the presence of a cross-linking agent would increase the molecular weight of the material and thus, in principle, decrease superabsorbent properties. Processes are also known for the derivatisation of cellulose in crystalline or powder form but these are generally of lower molecular weight than fibrous cellulose with the hydroxyl groups more accessible so that different approaches are applicable to derivatisation of crystalline and powder form cellulose than to fibrous cellulose.

An object of the present invention is to provide a superabsorbent polymer based on a polysaccharide, preferably a fibrous polysaccharide, more preferably fibrous cellulose which has improved superabsorbent properties. It has now surprisingly been found that such a product can be produced by combining derivatisation of the polysaccharide with a appropriate degree of cross-linking to maintain water insolubility. The improvement in superabsorbent properties brought about by an increased number of functional groups (higher ds) more than outweighs any effect that the cross-linking agent has on super-absorbent properties and the product has improved superabsorbent properties, for example as compared to products of the type disclosed in WO 92/19652. Thus use of a cross-linking agent makes it possible to control the gel strength of the product and makes it easier to tailor the characteristics of the product to those which are required.

According to one aspect the present invention provides a cationic polysaccharide, preferably a fibrous cationic polysaccharide, having superabsorbent characteristics, the polysaccharide being substituted by quaternary ammonium groups and having a ds of at least 0.5, preferably 0.5 to 2.5, and the polysaccharide being cross-linked to a sufficient extent that it remains insoluble in water.

The polysaccharide according to the present invention is preferably based on cellulose, more preferably fibrous cellulose, although the invention can also be applied to other polysaccharides such as starch and natural products based on saccharide units. The present invention can be applied to fibrous cellulose derived by any chemical and/or mechanical treatment, for example cellulose fibres obtained from wood pulp purified by the sulphate process or the bisulphite process, cellulose fibres obtained from wood pulp by thermomechanical or mechanical treatment, beet cellulose, regenerated cellulose or cotton linters. Preferably the cellulose fibres are obtained from wood pulp purified by the sulphate process or as cellulose "fluff" derived from mechanical treatment or wood pulp and are of the type generally used for the preparation of absorbent pads in disposable products, for example sanitary napkins and towels and diapers. The invention may also be applied to cellulose powders.

The polysaccharide according to the invention can be prepared by a process which involves derivatising a polysaccharide, preferably a fibrous polysaccharide, with quaternary ammonium groups and cross-linking with a suitable cross-linking agent. The derivatising and cross-linking can generally be carried out under similar conditions so that it is possible to carry out both reactions in a single stage. However, the reactions may become competitive so that it is preferred to carry out the derivatising reaction as a first stage, followed by cross-linking as a separate second stage. This two stage approach allows greater control of the reaction in terms of ds, degree of cross-linking, freedom from undesired secondary products, etc.

According to another aspect, the present invention provides a process for the production of a cationic polysaccharide, preferably a fibrous cationic polysaccharide, having superabsorption characteristics which comprises:

(i) reacting a polysaccharide with an excess of a quaternary ammonium compound containing at least one group capable of reacting with polysaccharide hydroxyl groups to provide a polysaccharide with a ds of at least 0.5; and simultaneously or subsequently (ii) reacting the derivatised polysaccharide with a cross-linking agent to provide a degree of cross-linking sufficient that the product remains insoluble in water.

Preferably the polysaccharide is in fibrous form.

Preferably step (ii) is carried out subsequently to step (i) with or without intermediate isolation of the product of step (i). Use of the cross-linking agent in the process according to the invention improves the yield of the process by reducing the amount of soluble product which is obtained. When the derivitisation reaction starts the polysaccharide substrate is insoluble but after derivatisation all or part of the substrate (depending on degree of substitution) may become soluble. Cross-linking may cross-link soluble polymer chains together or with insoluble polymer chains thereby preventing loss of material by solubilisation.

The reaction with the quaternary ammonium compound is generally carried out in the presence of base and preferably in aqueous medium. However, other protic or aprotic solvents for example alcohols, preferably lower alkanols such as ethanol, propanol or isopropanol, or amides such as DMF, can also be used either alone or in admixture with water. Suitable bases include alkali and alkaline earth metal hydroxides and alkoxides, for example the hydroxide, methoxide, ethoxide, propoxide, isopropoxide, n-butoxide or t-butoxide of an alkali metal such as potassium or preferably sodium. The most preferred base is generally sodium hydroxide.

Suitable quaternary ammonium compounds can be represented by one of the following general formulae (I) and (II):

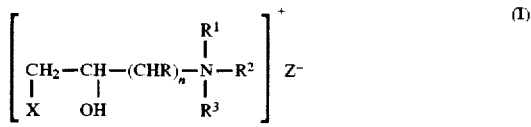

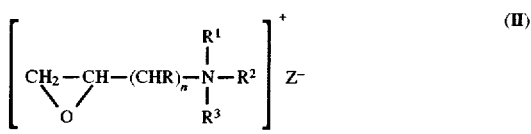

wherein n is an integer from 1 to 16;

X is halogen, in particular fluorine, chlorine, bromine or iodine, preferably chlorine;

$Z^-$ is an anion which may be inorganic, for example halide (fluoride, chloride, bromide or iodide, preferably chloride), nitrate, nitrite; phosphate or hydroxide, or organic, for example carboxylate such as acetate or propionate;

R, $R^1$, $R^2$ and $R^3$, which may be the same or different, are each an organic radical, preferably containing up to 10 carbon atoms, or preferably hydrogen; or additionally $R^2$ may represent a group of formula (III) or (IV):

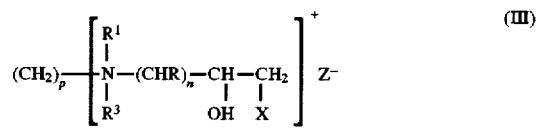

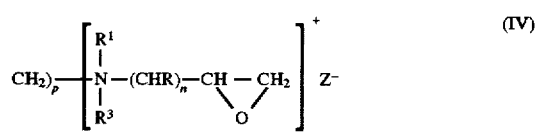

in which p is an integer from 2 to 10: and n, R, $R^1$, $R^3$, X and Z are as defined above.

The preferred meaning for each of R, $R^1$, $R^2$ and $R^3$ is hydrogen. When one of these groups is an organic radical this should not contain any substituent having an unacceptable adverse effect on the derivatisation reaction or the subsequent cross-linking reaction or on the properties of the material produced, for example superabsorbent properties. Suitable organic groups include alkyl, hydroxyalkyl, alkenyl and aryl. Large organic groups increase the molecular weight of the product so that smaller groups are preferred. The most preferred organic group is methyl or hydroxymethyl.

Many compounds having the above formulae are known or can be prepared by conventional procedures. Some such compounds are commercially available. Examples of suitable quaternary ammonium compounds include:

glycidyltrimethylammonium chloride;

2,3-epoxypropyl-N,N,N-trimethylammonium chloride (commercially available from Degussa A. G. as a 70% aqueous solution under the name QUAB 151 or as the pure compound in solid form from Fluka under product code 50045);

3-chloro-2-hydroxypropyl-N,N,N-trimethylammonium chloride (commercially available from Degussa A. G. as a 65% aqueous solution under the name of QUAB 188);

3-chloro-2-hydroxypropyl-N,N,N-dimethylethanolammonium chloride (commercially available from Degussa A. G. as a 65% aqueous solution under the name of QUAB 218);

1,3-bis-(3-chloro-2-hydroxypropyl-N,N-dimethylammonium)-N-propane dichloride (commercially available from Degussa A. G. as a 65% aqueous solution under the name of QUAB 388);

A particularly preferred quaternary ammonium compound is glycidyltrimethylammonium chloride.

The derivatisation reaction with the quaternary ammonium compound can be carried out in a single step or as two or more steps with or without intermediate separation and purification of the product. In the or each step, the reaction is carried out by contacting the polysaccharide with the base, preferably in aqueous medium.

Typically, the quaternary ammonium compound is used in excess, for example in a molar ratio based on saccharide units in the polysaccharide of 5:1 to 40:1, more particularly 20:1 to 40:1. Where the derivatisation reaction is carried out in two or more steps a molar ratio of 10:1 to 20:1 preferably applies in each step. The base, preferably sodium hydroxide, is used in the or each step in a molar ratio of 1:3 to 3:1 based on hydroxyl groups in the monosaccharide units and in a molar ratio of 5:100 to 300:100, preferably 100:100 to 300:100, based on the quaternary ammonium compound where this is a compound of formula (I) or 10:100 to 50:100 where this is a compound of formula (II). The reaction temperature for the or each step may be from 15° to 120° C., preferably 70° to 100° C., and the reaction time overall may be for example 1 to 20 hours. Where the derivatisation reaction is carried our in two or more stages, the reaction time for each stage will generally be 0.25 to 5 hours, preferably 0.25 to 2 hours.

The derivatised product may be isolated and purified by removing excess alkali by washing to neutrality, for example with dilute, e.g. 4%, aqueous sodium chloride. The product may then be converted to salt form by treatment with a strong excess of acid, e.g. 4% aqueous hydrochloric acid, and washed to neutral. The product is then dehydrated, for example with acetone and recovered by filtration and/or centrifugation.

Derivatised polysaccharides prepared as described above in which one or more of $R^1$, $R^2$ and $R^3$ is hydrogen can subsequently be converted into the corresponding compounds in which one or more of $R^1$, $R^2$ and $R^3$ is a hydrocarbon group by an N-alkylation reaction, for example with a compound of formula $R^5Hal$ where $R^5$ is an optionally substituted hydrocarbon group, for example alkyl, hydroxyalkyl or alkenyl and Hal is halogen, more particularly fluorine, chlorine, bromine or iodine, to effect quaternisation of some of all of the ammonium groups.

As indicated above, the polysaccharide is cross-linked either in the same reaction as the derivatisation reaction or preferably subsequently thereto.

Suitable cross-linking agents for polysaccharides such as cellulose include:

formaldehyde;

methylolated nitrogen compounds such as dimethylolurea dimethylolethyleneurea and dimethylolimidazolidone;

diacarboxylic acids such a maleic acid;

dialdehydes such as glyoxal;

diepoxides such a 1,2:3,4-diepoxybutane and 1,2:5,6-diepoxyhexane;

diisocyanates;

divinyl compounds such as divinylsulphone;

dihalogen compounds such as dichloroacetone, dichloroacetic acid, 1,3-dichloropropan-2-ol, dichloroethane, 2,3-dibromo-1-propanol, 2,3-dichloro-1-propanol and 2,2-dichloroethyl ether;

halohydrins such as epichlorohydrine;

bis(epoxypropyl)ether;

vinylcyclohexenedioxide;

ethylene glycol-bis(epoxypropyl)ether;

1,3-bis(β-hydroxy-Γ-chloropropoxy)-2-propanol;

1,3-bis(β-hydroxy-Γ-chloropropoxy)ethane;

methylenebis(acrylamide);

N,N'-dimethylol(methylenebis(acrylamide));

triacrylolhexahydrotriazine;

acrylamidomethylene chloroacetamide;

2,4,6-trichloropyrimidine;

2,4,5,6-tetrachloropyrimidine cyanuric chloride;

triallylcyanurate phosphorusoxychloride;

bis(acrylamido)acetic acid

For further information concerning suitable cross-linking agents, reference can be made to U.S. Pat. No. 3,658,613, U.S. Pat. No. 3,589,364, U.S. Pat. No. 4,066,828 and U.S. Pat. No. 4,068,068.

Preferred cross-linking agents include di-epoxy compounds and haloepoxy compounds such as 1,3-bis(glycidyldimethylammonium)propanedichloride and epichlorohydrin.

Where the cross-linking and derivatisation reactions are carried out together, the conditions are as described above for the derivatisation reaction. Where the cross-linking reaction is carried out as a subsequent step following the derivatisation reaction, the reaction conditions are also generally as described above for the derivatisation reaction. The amount of cross-linking agent which is necessary will depend on the nature of the agent, the starting material and the conditions of the cross-linking reaction. In all cases the reaction should be such as to provide a degree of cross-linking which imparts the desired water insolubility to the polymer but does not interfere with the water absorption properties of the polymer (superabsorbent properties) imparted by the quaternary ammonium group.

Preferably the cross-linking reaction is carried out at a temperature of 15° to 110° C., more preferably 35° to 85° C. for a time of 1 to 20 hours, preferably 2 to 10 hours.

The degree of substitution and the degree of cross-linking can both be controlled by appropriate variation in the amounts of starting materials and the reaction conditions, in particular the concentration of the derivatising and/or cross-linking reagent, reaction time, amount of base, reaction temperature, and the nature of the substrate. Where the process according to the invention is applied to a polysaccharide other than cellulose, then appropriate modifications will need to be made to the reaction conditions and, for example, it is known that starch is generally more reactive than cellulose.

The process as described above leads to the polysaccharide derivative in base form as a result of the use of base (e.g. sodium hydroxide) as catalyst in the derivatisation and cross-linking reactions. In general the polysaccharide is required in salt form and this can be prepared by treatment with strong acid (e.g. HCl) followed by washing with water to neutral pH. If necessary, the polysaccharide in salt form can be converted to base form by treatment with strong base (e.g. NaOH) followed by washing with water.

According to one embodiment of the invention, cellulose, for example in the form of cellulose Kraft pulp, is derivatised with glycidyltrimethylammonium chloride, for example to a ds of about 0.65, and then cross-linked with 1,3-bis(glycidyldimethylammonium)propane dichloride in the presence of sodium hydroxide. The reaction scheme can be represented as follows:

In use in absorbing saline, for example in the form of salt containing liquids such as urine or menses, there are considerable advantages in using the polysaccharide according to the invention in basic form. In this case, at the same time as absorbing the liquid, the polymer also has a desalting effect on the liquid by virtue of the fact that on being placed in salt solution the quaternary ammonium groups in basic form act as a strong anion exchanger and convert spontaneously to salt form.

The absorbent according to the present invention is particularly suitable for use in applications where it is desired to absorb salt containing aqueous liquids. Examples of such 1 Derivatisation

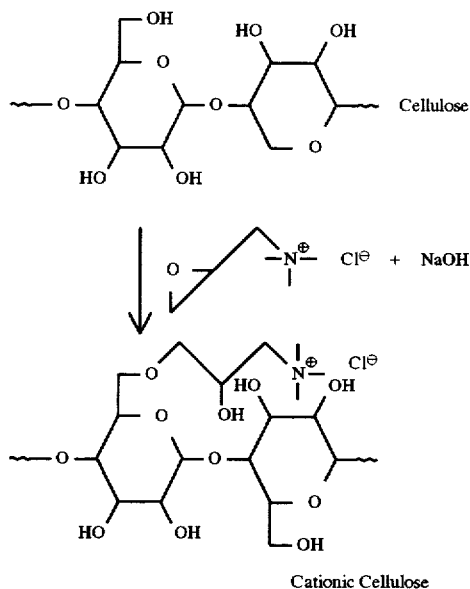

2 Cross-Linking

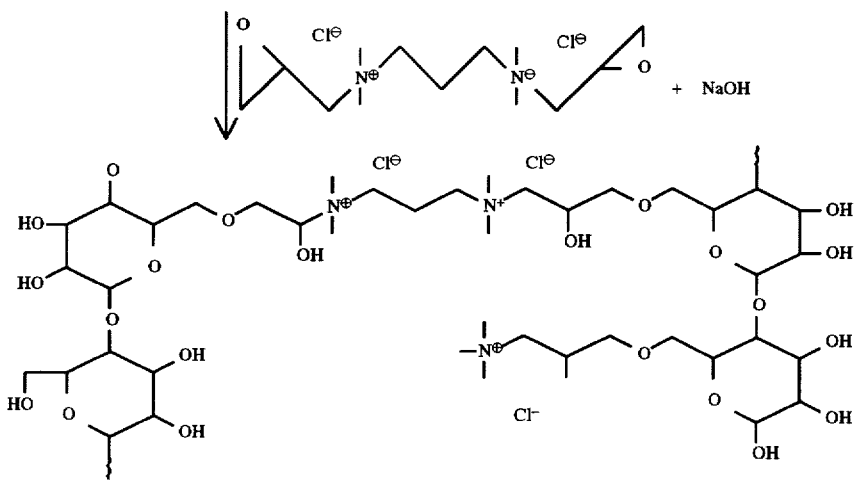

The cationic cross-linked cellulose according to the present invention can be prepared without a limitation on ds imposed by increasing water solubility. The material can be used as an absorbent for water or saline in either salt of basic form.

liquids include in particular menses and urine and particularly when in fibrous form the absorbent material can be used as the filling in catamenials and diapers, generally in admixture with a fibrous absorbent such a cellulose fluff. The absorbent according to the present invention, in base form can also be used in conjunction with an anionic superabsorbent in free acid form or a cation exchanger in acid form as described in our co-pending patent applications Nos . . . (internal reference DR 24) and . . . (internal reference DR 26) respectively.

According to a further aspect the present invention provides the use of a cationic polysaccharide, preferably a fibrous cationic polysaccharide, as defined above as an absorbent, more particularly as an absorbent in hygienic and/or sanitary articles.

The invention is illustrated by the following examples:

Example 1

10 g of cellulose Kraft pulp were mixed with 6.7 g of NaOH and 28 ml distilled water. The mixture was cooled for 30 minutes in an ice-salt bath and 46.74 g of glycidyl trimethyl ammonium chloride in 20 ml of distilled water were added. The temperature was maintained at 80° to 85° C. for 30 minutes with continuous stirring. After this time the same quantity of glycidyl trimethyl ammonium chloride in water was added and again the mixture was maintained at 80° to 85° C. for 30 minutes with continuous stirring. The procedure was repeated a further three times (a total of 5 additions of glycidyl trimethyl ammonium chloride).

The sample was then washed with NaCl (4% in water: 2 liters) and filtered under vacuum using a Buchner filter (water pump vacuum). The sample was transferred to a 5 liter vessel and treated with 2.5 liters of 4% hydrochloric acid followed by filtration as previously described. The sample was then washed with water to neutral pH, filtered as previously described and then dried by adding a large amount of acetone. The ds of the product at this stage (defined as the number of quaternary ammonium groups per cellulose anhydroglucose units and measured as described in WO 92/19652) was 0.65.

a) 1 g of the derivatised product was mixed with 5 ml of 19% aqueous sodium hydroxide. 0.88 g of a 65% aqueous solution of 1,3-bis(glycidyl dimethyl ammonium)propane dichloride was added under stirring at room temperature and maintained under these conditions for 16 hours. The sample was the washed with water to neutral pH and lyophilised.

The sample had an absorbency (tea-bag test as described below) of 54 (after draining) and 29 (after centrifugation at 60 g).

b) The experiment of (a) above was repeated but using an amount of cross-linking agent reduced by half.

The sample had an absorbency (tea-bag test) of 21 (after draining) and 18 (after centrifugation at 60 g).

The tea-bag test was performed by weighing about 0.3 g of the product into a tea-bag envelope which was itself then weighed and immersed in 150 ml of liquid (1% NaCl Solution or distilled water) in a 250 ml beaker for 1 hour. The envelope was then removed from the liquid and allowed to drain for 10 minutes, weighed, and then centrifuged at 60 g for 10 minutes and weighed again. Absorbency is calculated as follows:

$$A=(W_{wet}-W_{dry})/G$$

where:

A=absorbency (after draining or centrifugation);

$W_{wet}$=weight of envelope containing sample after draining or centrifugation (grams);

$W_{dry}$=weight of envelope containing sample before immersion (grams);

G=weight of sample used for the test (grams).

Use of distilled water in the above test gives a measure of maximum swelling power whereas saline gives a reduced figure which is more predictive of the behaviour of the material in practice.

Example 2

(a) 10 g cellulose powder (Farmitalia Carlo Erba SpA, Rome, Italy) were mixed with 6.5 g NaOH dissolved in 28 ml distilled water. The mixture was cooled for 30 minutes in an ice-salt bath and 46.74 g of glycidyl trimethyl ammonium chloride in 20 ml of distilled water were added. The temperature was maintained at 80° C. for 30 minutes with continuous stirring. The same quantity of glycidyltrimethyl ammonium chloride in water was then added and again the mixture was maintained at 80° C. for 30 minutes. The procedure was then repeated twice more (a total of 4 additions of glycidyltrimethyl ammonium chloride). The product was purified by the method described in Example 1 and the product had a ds of 0.53.

(b) 0.5 g of the purified product was mixed with 2.5 ml of 19% NaOH and 0.44 ml of 65% 1,3-bis(3-chloro-2-hydroxylpropyl)dimethylammonium propane dichloride in water with continuous stirring for 5 hours. The temperature was maintained at 25° C. and after addition of 10 ml of distilled water the temperature was maintained for 16 hours. The gel obtained was purified as described in Example 1 and lyophilized.

The product had an absorbency (tea-bag test in accordance with Example 1) of 50 (after draining) and 39 (after centrifugation).

Example 3

(a) The procedure of Example 2(a) was repeated to produce a different sample of essentially the same product but with a ds of 0.50.

(b) The procedure was as in Example 2(b) except the temperature was maintained at 20° C.

The product had an absorbency (tea-bag test in accordance with Example 1) of 34 (after draining) and 29 (after centrifugation).

In summary the results obtained were as follows:

| Product | ds of intermediate | ratio of intermediate to cross-linker | Absorbency | |
|---|---|---|---|---|
| | | | after draining | after centrifugation |
| Example 1 (a) | 0.65 | 2.5:1 | 54 | 29 |
| Example 1 (b) | 0.65 | 5:1 | 21 | 18 |
| Example 2 (b) | 0.53 | 2.5:1 | 50 | 39 |
| Example 3 (b) | 0.5 | 2.5:1 | 34 | 29 | ds of the intermediates is measured as described in WO 92/19652. The ds of the final product was not measured but would not be expected to differ significantly from the intermediate.

Comparative Example

The product of Example 2 of WO 92/19652 had a ds 0.64, and an absorbency (tea-bag test in accordance with Example 1) of 42.9 (after draining) and 23.2 (after centrifugation). 0.25 g of the same product in a tea-bag type envelope is placed in 1 liter of 0.1N NaOH (aqueous solution) for 10 hours with mechanical stirring and is then washed with water to neutrality and dried with acetone to produce the product in unsalified form which had an absorbency of 42.9 (after draining) and 23.2 (after centrifugation).

The products of Examples 1(a) and 1(b) show improved gel strength and are obtained in improved yield relative to WO 92/19652. The products of Examples 2(b) and 3(b) were obtained from intermediates which were soluble.

We claim:

1. A cationic polysaccharide having superabsorbent characteristics, the polysaccharide being substituted by quaternary ammonium groups and having a ds of at least 0.5, and the polysaccharide being cross-linked to a sufficient extent that it remains insoluble in water.

2. The cationic polysaccharide according to claim 1 wherein the polysaccharide is cellulose.

3. The cationic polysaccharide according to claim 1 in fibrous form.

4. The cationic polysaccharide according to claim 1 wherein the quaternary ammonium groups are derived from a quaternary ammonium compound of one of the general formulae (I) and (II):

$$\left[ \begin{array}{c} CH_2-CH-(CHR)_n-N-R^2 \\ | \quad | \quad \quad | \\ X \quad OH \quad \quad R^3 \end{array} \right]^+ Z^- \quad (I)$$

$$\left[ \begin{array}{c} CH_2-CH-(CHR)_n-N-R^2 \\ \backslash / \quad \quad \quad | \\ O \quad \quad \quad R^3 \end{array} \right]^+ Z^- \quad (II)$$

wherein n is an integer from 1 to 16;

X is halogen;

$Z^-$ is an inorganic or organic anion;

R, $R^1$, $R^2$ and $R^3$, which may be the same or different are each hydrogen or an organic radical; or additionally $R^2$ may represent a group of formula (III) or (IV):

$$-(CH_2)_p-\left[ \begin{array}{c} R^1 \\ | \\ N-(CHR)_n-CH-CH_2 \\ | \quad \quad \quad | \quad | \\ R^3 \quad \quad \quad OH \; X \end{array} \right]^+ Z^- \quad (III)$$

$$-(CH_2)_p-\left[ \begin{array}{c} R^1 \\ | \\ N-(CHR)_n-CH-CH_2 \\ | \quad \quad \quad \backslash / \\ R^3 \quad \quad \quad O \end{array} \right]^+ Z^- \quad (IV)$$

in which p is an integer from 2 to 10; and n, R, $R^1$, $R^2$, $R^3$ X and Z are as defined above.

5. The cationic polysaccharide according to claim 4 wherein each of R, $R^1$, $R^2$ and $R^3$ is hydrogen or an alkyl, hydroxyalkyl, alkenyl or aryl group containing up to 10 carbon atoms.

6. The cationic polysaccharide according to claim 5 wherein each of R, $R^1$, $R^2$ and $R^3$ is hydrogen.

7. The cationic polysaccharide according to claim 6 wherein the quaternary ammonium compound is selected from:

glycidyltrimethylammonium chloride;

2,3-epoxypropyl-N,N,N-trimethylammonium chloride;

3-chloro-2-hydroxypropyl-N,N,N-trimethylammonium chloride;

3-chloro-2-hydroxypropyl-N,N,N-dimethylethanolammonium chloride; and 1,3-bis-(3-chloro-2-hydroxypropyl-N,N-dimethylammonium)-N-propane dichloride.

8. The cationic polysaccharide according to any of claim 1 wherein the cross-linking agent is a diepoxy compound or a haloepoxy compound.

9. The cationic polysaccharide according to claim 8 wherein the cross-linking agent is 1,3-bis(glycidyl dimethylammonium)propane dichloride or epichlorohydrin.

10. The cationic polysaccharide according to claim 1 having a ds of from 0.5 to 2.5.

11. A process for the production of a cationic polysaccharide having superabsorption characteristics which comprises:

(i) reacting a polysaccharide with an excess of a quaternary ammonium compound containing at least one group capable of reacting with polysaccharide hydroxyl groups to provide a polysaccharide with a ds of at least 0.5; and simultaneously or subsequently (ii) reacting the derivatised polysaccharide with a cross-linking agent to provide a degree of cross-linking sufficient that the product remains insoluble in water.

12. The process according to claim 11 wherein the polysaccharide is cellulose.

13. The process according to claim 11 wherein the polysaccharide is a fibrous polysaccharide.

14. The process according to claim 11 wherein the quaternary ammonium compound is a compound of one of the general formulae (I) and (II):

$$\left[ \begin{array}{c} CH_2-CH-(CHR)_n-N-R^2 \\ | \quad | \quad \quad | \\ X \quad OH \quad \quad R^3 \end{array} \right]^+ Z^- \quad (I)$$

$$\left[ \begin{array}{c} CH_2-CH-(CHR)_n-N-R^2 \\ \backslash / \quad \quad \quad | \\ O \quad \quad \quad R^3 \end{array} \right]^+ Z^- \quad (II)$$

wherein n is an integer from 1 to 16;

X is halogen;

$Z^-$ is an inorganic or organic anion;

R, $R^1$, $R^2$ and $R^3$, which may be the same or different are each hydrogen or an organic radical; or additionally $R^2$ may represent a group of formula (III) or (IV):

$$-(CH_2)_p-\left[ \begin{array}{c} R^1 \\ | \\ N-(CHR)_n-CH-CH_2 \\ | \quad \quad \quad | \quad | \\ R^3 \quad \quad \quad OH \; X \end{array} \right]^+ Z^- \quad (III)$$

$$-(CH_2)_p-\left[ \begin{array}{c} R^1 \\ | \\ N-(CHR)_n-CH-CH_2 \\ | \quad \quad \quad \backslash / \\ R^3 \quad \quad \quad O \end{array} \right]^+ Z^- \quad (IV)$$

in which p is an integer from 2 to 10; and n, R, $R^1$, $R^2$, $R^3$ X and Z are as defined above.

15. The process according to claim 14 wherein each of R, $R^1$, $R^2$ and $R^3$ is hydrogen or an alkyl, hydroxyalkyl, alkenyl or aryl group containing up to 10 carbon atoms.

16. The process according to claim 15 wherein each of R, $R^1$, $R^2$ and $R^3$ is hydrogen.

17. The process according to claim 16 wherein the quaternary ammonium compound is selected from:

glycidyltrimethylammonium chloride;

2,3-epoxypropyl-N,N,N-trimethylammonium chloride;

3-chloro-2-hydroxypropyl-N,N,N-trimethylammonium chloride;

3-chloro-2-hydroxypropyl-N,N,N-dimethylethanolammonium chloride; and 1,3-bis-(3-chloro-2-hydroxypropyl-N,N-dimethylammonium)-N-propane dichloride.

18. The process as claimed in claim 11 wherein the cross-linking agent is a diepoxy compound or a haloepoxy compound.

19. The process as claimed in claim 18 wherein the cross-linking agent is 1,3-bis(glycidyl dimethylammonium) propane dichloride or epichlorohydrin.

20. The process as claimed in claim 11 wherein step (ii) is carried out subsequently to step (i).

21. The process as claimed in claim 11 wherein the quaternary ammonium compound is used in a molar ratio based on saccharide units in the polysaccharide of 5:1 to 40:1, or wherein the reaction is carried out in two or more steps and a molar ratio of 10:1 to 20:1 applied in each step.

22. The process as claimed in claim 11 wherein derivatisation and cross-linking reactions are carried out in the presence of base.

23. The process as claimed in claim 22 wherein the base is an alkaline earth metal hydroxide or alkoxide.

24. The process as claimed in claim 23 wherein the base is sodium hydroxide.

25. A method of absorbing a liquid which comprises of introducing the cationic polysaccharide of claim 1 to a liquid to be absorbed.

26. The method according to claim 25, wherein the cationic polysaccharide is incorporated as an absorbent in a hygiene and/or sanitary article.

* * * * *

UNITED STATES PATENT AND TRADEMARK OFFICE
CERTIFICATE OF CORRECTION

PATENT NO. : 5,780,616
DATED : July 14, 1998
INVENTOR(S) : Fornasari et al.

It is certified that error appears in the above-identified patent and that said Letters Patent is hereby corrected as shown below:

Title page,
Item [63], Foreign Application Priority Data, please delete "TO94A0891" and insert therefor -- TO94A000891 --.

Column 1,
Line 36, please delete "salvation" and insert therefor -- solvation --.OK.

Column 7,
Line 14, please delete the reaction scheme for Derivatisation and Cross-Linking and replace it with the following:

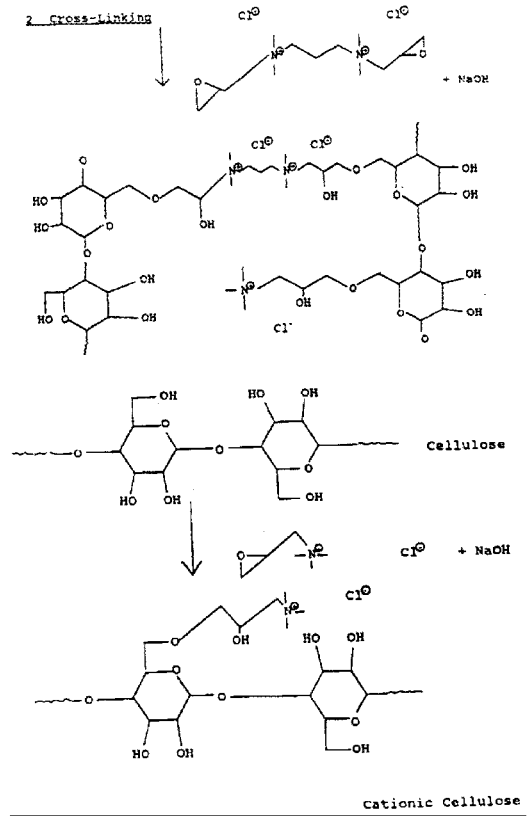

UNITED STATES PATENT AND TRADEMARK OFFICE
CERTIFICATE OF CORRECTION

PATENT NO. : 5,780,616
DATED : July 14, 1998
INVENTOR(S) : Fornasari et al.

It is certified that error appears in the above-identified patent and that said Letters Patent is hereby corrected as shown below:

Column 10,
Line 48, please delete extra carriage return in table after "Absorbency" to compress the headings of the columns.

Column 11,
Line 3, please delete "0.1N" and insert therefor -- 0.1 N --.

Signed and Sealed this

Twenty-fourth Day of August, 2004

JON W. DUDAS
*Director of the United States Patent and Trademark Office*

UNITED STATES PATENT AND TRADEMARK OFFICE
CERTIFICATE OF CORRECTION

PATENT NO.   : 5,780,616
DATED        : July 14, 1998
INVENTOR(S)  : Fornasari et al.

It is certified that error appears in the above-identified patent and that said Letters Patent is hereby corrected as shown below:

Column 9,
Lines 2-4, delete "applications Nos . . . (internal reference DR 24) and . . . (internal reference DR26 respectively." and insert therefor -- application serial nos. 08/849,607 and 08/836,298 --.

Signed and Sealed this

Nineteenth Day of October, 2004

JON W. DUDAS
*Director of the United States Patent and Trademark Office*